(No Model.)
A. J. HOAG & J. A. DREW.
TRACTION ENGINE.
No. 265,809. Patented Oct. 10, 1882.
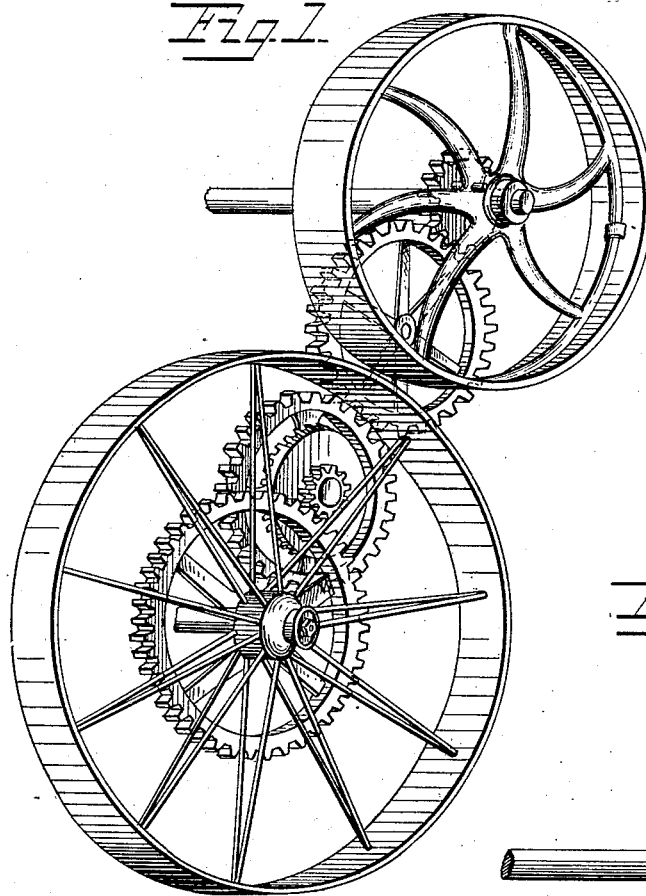
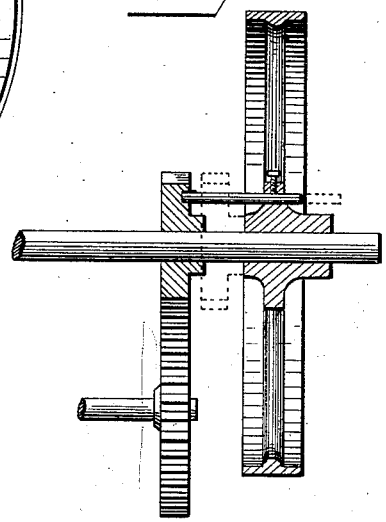
Witnesses:
Franck L. Ourand
H. N. Jenkins
Inventors:
Andrew J. Hoag
John A. Drew
by A. Mahon
Attorney
N. PETERS, Photo-Lithographer, Washington, D. C.

UNITED STATES PATENT OFFICE.

ANDREW J. HOAG AND JOHN A. DREW, OF BATTLE CREEK, MICHIGAN, ASSIGNORS TO NICHOLS, SHEPARD & CO., OF SAME PLACE.

TRACTION-ENGINE.

SPECIFICATION forming part of Letters Patent No. 265,809, dated October 10, 1882.

Application filed July 31, 1882. (No model.)

*To all whom it may concern:*

Be it known that we, ANDREW J. HOAG and JOHN A. DREW, both of Battle Creek, county of Calhoun, State of Michigan, have invented certain new and useful Improvements in Shifting Pinions for Traction-Engines, of which the following is a full and exact description, reference being had to the accompanying drawings, making part of this specification, in which—

Figure 1 is a perspective view of so much of the gearing of a traction-engine as is necessary for an understanding of our improvements. Fig. 2 is a section through the band or fly wheel and shifting pinion, showing the manner of connecting said pinion with the band or fly wheel.

In traction-engines, where it is necessary to shift the traction-gear out of engagement when the power of the engine is used for driving a thrashing or other machine, the great object has been to obtain a simple and effective device which could be easily adjusted, and which was in convenient position to be readily reached by the attendant.

The ordinary pinion mounted on the engine-shaft, which was adapted to be moved on said shaft into or out of engagement with the gearing moving the traction-wheels, while having been found the most simple and that best suited for the purpose, was open to serious objection, for the reason that said pinion was held in position on the shaft by means of a set-screw, which, from the constant jar, tended to work loose, in which case the screw was liable to drop out and be lost; or when the engine was stopped at a point so that the screw would come on the under side of the shaft it was impossible to reach it without turning the shaft round by hand until the screw was brought to the upper side, and even when the screw was brought to this point and loosened and the pinion moved out of engagement with the traction-gearing it was almost impossible to so tighten the screw as to prevent it from jarring loose and preventing the pinion from sliding upon the shaft into gear with said traction-gearing and move the engine after it had been fixed to run the thrashing or other machinery, or into gear to such an extent as to break the teeth of the intermeshing gears.

Our invention has for its object the remedying of the before-mentioned objections; and it consists in providing the ordinary pinion with a projecting rod, bar, or shaft adapted to move in a bearing or perforation formed in the hub or spoke of the band or fly wheel, and in securing said pinion, through said rod, bar, or shaft, to the band or fly wheel by means of a set-screw or equivalent device, by which means the pinion is held firmly in place on the shaft and the set-screw or holding device brought to such a point as to be always in convenient reach of the attendant, as hereinafter described.

In the accompanying drawings, A represents the main engine-shaft, upon which the band or fly wheel B is mounted. C is the shifting pinion, also mounted on the main engine-shaft, but being free to slide thereon. This pinion is provided on one side with a projecting bar or rod, C′, which has a bearing in the band or fly wheel B, as shown at $C^2$. This bearing is formed in the hub of the fly-wheel, just outside of the main shaft, and about at the junction of two of the spokes, as shown at Fig. 1. This bar or rod is free to slide through this bearing, but adapted to be held at any desired point of adjustment by means of a set-screw, D, as shown. The pinion C meshes with a gear, E, and through which gear motion is communicated from the main engine-shaft to the traction-wheels through any suitable arrangement of gearing. By means of the sliding rod or bar secured to the pinion it will be seen that said pinion has two bearings—one on the main engine-shaft and one in the band or fly wheel—which arrangement tends to hold said pinion in its adjusted position; but being further secured to the band or fly wheel by means of the set-screw, all liability of said pinion becoming accidentally displaced or thrown into gear after being thrown out is obviated.

The operation is as follows: When the pinion is in mesh with the gear E, as shown in full lines, Figs. 1 and 2, the engine will drive the traction-gearing and propel the machine over the road; but when it is desired to throw said gear out of action, so as to transmit the power through the band or fly wheel to a thrashing or other machine, by loosening the set-screw, which by the arrangement shown is brought into convenient reach of the attendant, the pinion can be drawn out toward the band or fly wheel, as shown in dotted lines, Fig. 2, out of engagement with the traction-gearing, permitting the power to be transmitted through the band or fly wheel to said thrashing or other machine.

The rod or bar may be made flat or round, as is found most convenient, and a different device than the set-screw described may be used for connecting it to the band or fly wheel; but the arrangement shown has been found most desirable.

The device as shown is particularly applicable to the "Vibrator" traction-engine manufactured by Nichols, Shepard & Co., and the gearing shown, through which motion is communicated from the main engine-shaft to the traction-wheels, is like that shown in said engine, as also the parts not shown, though the device is applicable to other traction-engines, and in that kind where an inclined shaft and bevel-gear is used a corresponding bevel-pinion can be substituted for the straight pinion shown.

Having now described our invention, we claim—

1. The shifting pinion provided with the projecting rod, bar, or shaft for adapting it to be connected with the band or fly wheel, for the purpose and substantially as described.

2. The shifting pinion connected to the band or fly wheel through the rod, bar, or shaft, for the purpose and substantially as described.

3. The shifting pinion provided with the projecting rod, bar, or shaft, said shaft having its bearing in the band or fly wheel, in combination with the set-screw or equivalent device for holding said gear in its adjusted position, for the purpose and substantially as described.

ANDREW J. HOAG.
JOHN A. DREW.

Witnesses:
FRANK W. DUNNING,
FRANK T. ROBERTS.